Oct. 19, 1954  T. H. BIRCH ET AL  2,691,989
STOP-FLOW VALVE FOR AIR BRAKE CYLINDERS
Filed June 29, 1951  2 Sheets-Sheet 1

INVENTORS.
Thomas H. Birch &
Gustav H. Koester
By Mann, Brown and Hanssmann
Attys.

Oct. 19, 1954     T. H. BIRCH ET AL     2,691,989
STOP-FLOW VALVE FOR AIR BRAKE CYLINDERS
Filed June 29, 1951     2 Sheets-Sheet 2
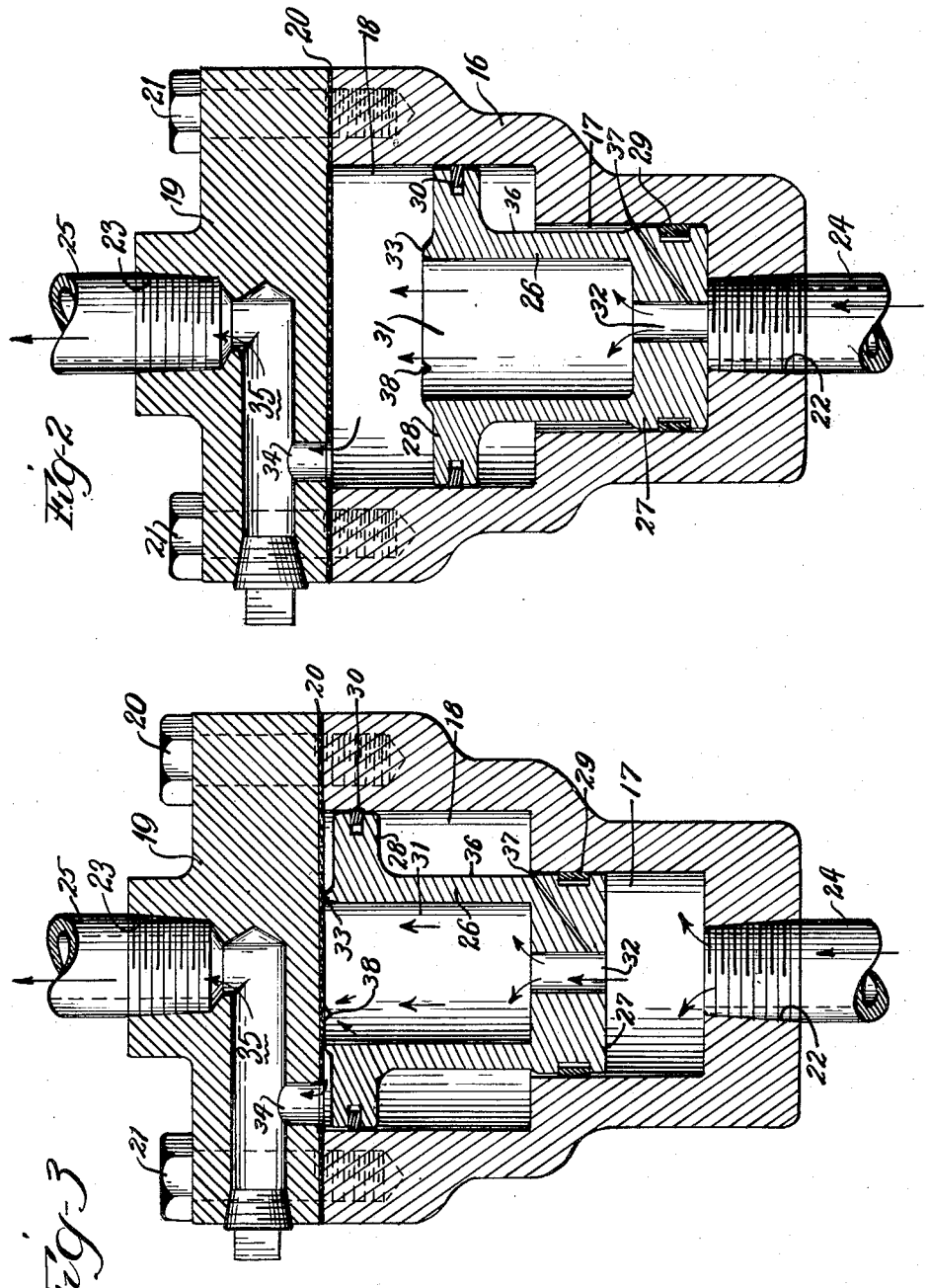
INVENTORS.
Thomas H. Birch &
Gustav H. Koester
By:-
Marin, Brown and Hausmann
Attys.

Patented Oct. 19, 1954

2,691,989

UNITED STATES PATENT OFFICE 2,691,989

STOP-FLOW VALVE FOR AIR BRAKE CYLINDERS

Thomas H. Birch, Milwaukee, and Gustav H. Koester, Wauwatosa, Wis.

Application June 29, 1951, Serial No. 234,316

4 Claims. (Cl. 137—460)

In locomotives and cars having brake cylinders mounted on the trucks, all of the cylinders on each locomotive or car are connected in one circuit connected to one supply pipe. Consequently, a break in any part of the circuit from the pressure end of the cylinder to the supply pipe releases the air supply to the atmosphere and renders the brakes on the car or locomotive entirely inoperative.

The principal object of this invention is to provide an automatic cut-off for any part of the circuit which is opened to the atmosphere by a break; and generally speaking, this is accomplished by inserting a stop-flow valve at a suitable place that will promptly stop the flow toward a break to the atmosphere and seal off the faulty part of the circuit.

Other objects and advantages of the invention will appear as the disclosure proceeds and the description is read in connection with the accompanying drawings, in which:

Fig. 2 is an axial section through the stop-flow valve in normal position; and

Fig. 3 is a similar section through the stop-flow valve in closed position.

Figure 1:
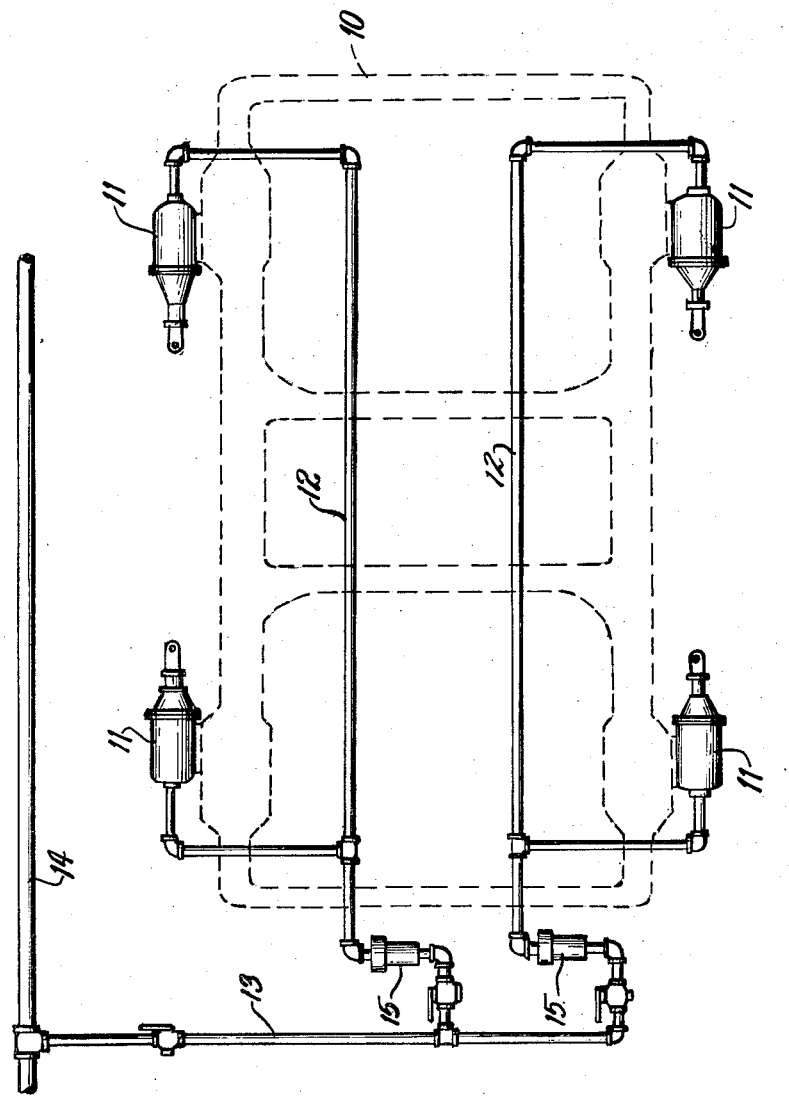
Fig. 1 is a diagram of a four-wheel truck equipped with four brake cylinders connected to a brake cylinder supply pipe together with two stop-flow valves inserted between pairs of cylinders on opposite sides of the truck and the supply pipe.

In Fig. 1, 10 indicates the frame of a four-wheeled truck equipped with four brake cylinders 11 connected in pairs by piping 12, in turn connected by branch pipe 13 with a brake cylinder supply pipe 14 receiving compressed air from the appropriate reservoir. In such a device, a break in any part of the piping 12 or in the pressure end of a cylinder 11 releases the air under pressure to the atmosphere and renders the brakes inoperative. To prevent this, according to the present invention one or more stop-flow valves 15 are connected between the branch pipe 13 and the piping 12, or some other part of the connections, to seal off any break in the system and let the remainder continue in operative condition.

In the preferred form of stop-flow valve shown in Figs. 2 and 3, there is a valve body 16 having cylinders 17 and 18 of different diameters, aligned in an axial direction and opening into each other. For convenience of description the cylinder 17, which is of smaller diameter, may be regarded as the inner cylinder, and the cylinder 18, of larger diameter, may be called the outer cylinder. The body is closed by a valve cap 19, secured against a gasket 20 by bolts 21. The cap and the valve body are provided with threaded openings 22 and 23 to receive nipples or pipes 24 and 25, by which the valve is connected to a suitable part of the system.

Within the valve body is a hollow piston valve 26 having inner and outer heads respectively designated 27 and 28 fitted into the respective cylinders 17 and 18 and equipped with piston rings 29 and 30. The valve has a main bore or chamber 31 and a central port 32 at its lower end which together provide a throughway; and, at its upper end, it has a ring or flange 33 forming a valve portion adapted to seat against the gasket 20 in closed position, as shown in Fig. 3.

The cap 19 has an outlet port 34 leading out of the cylinder 18 to a passage 35 connected with the threaded opening 23.

The outer cylindrical part of the valve 26 between the heads 27 and 28 is relieved or reduced at 36, and a small port 37 connects the port 32 (or the chamber 31) with the cylinder 17, in normal position shown in Fig. 2, and with the cylinder 18 in closed position shown in Fig. 3.

The ring or flange 33 is provided with a notch 38, which forms a by-pass for the valve 26 to allow a suitable amount of leakage when the valve is in closed position shown in Fig. 3.

In normal service, when the brakes are applied to a locomotive or car, air enters the valve through the pipe 24, whose connection with the valve body may be considered the normal inlet port, passes through the port 32 into the hollow chamber 31 of the valve, out through the cylinder 18, the port 34, the passage 35, and the pipe 25, to the brake cylinder or cylinders, as the case may be.

The by-pass 37 across the lower piston head permits a slow build-up of pressure in the cylinders 17 and 18 beneath the piston head 28, which will be equalized by the pressure on the upper side of the head 28 in the cylinder 18. Hence, as long as the brake cylinder or the piping leading to it is closed to the atmosphere, the piston valve 31 will not move.

However, in the event of a leak, such as a broken pipe or brake cylinder anywhere beyond the valve cap 19, the back pressure, which has been resisting the movement of the piston valve, will be relieved and the air pressure below the piston head 28 will raise the valve and close the rim 33 against the gasket 20, stopping the flow of air beyond the valve and sealing off that part of the system beyond the cap 19, except for small leakage through the groove 38.

The remainder of the system is operative to apply the brakes. For example, in Fig. 1, if a break should occur in the lower half of the figure, the lower stop-flow valve 15 would seal it off, but the brakes in the upper half of the figure would still be operative. Similar remarks apply to other applications, depending upon where the stop-flow valve is located with respect to the brake cylinder supply pipe.

The installation is such that neither gravity nor any other force or means can be relied upon to return the valve from the closed position of Fig. 3 to the open position of Fig. 2. This may be because the valve is disposed in a horizontal position as shown in Fig. 1, or because of friction of the rings 29, 30, or for any other reason.

When the necessary repairs have been made and the air pressure is again applied, air will leak through the notch 38 and, passing through the port 34 and the passage 35, will build up pressure in the system beyond the cap 19. Upon release, the back pressure will act upon the head 28 and return the valve to normal position, shown in Fig. 2. The operation is automatic.

The by-passes 37 and 38 are just large enough to permit a slow build-up or relief, as the case may be, and may be formed in a variety of ways and places. The sizes are necessarily related to the volumes.

The invention has broad application, but is especially valuable in multiple unit Diesel locomotives, and in railroad passenger cars with truck-mounted brake cylinders.

We claim:

1. In a valve for cutting off excess flow in a fluid brake system, a body having an inner cylinder of smaller diameter and an outer cylinder of larger diameter axially aligned and opening into each other and having inlet and outlet ports communicating respectively with said inner and outer cylinders, a piston having an inner and an outer head slidable in said inner and outer cylinders respectively and having a longitudinal throughway for normal passage of fluid from the inlet port to the outlet port, a by-pass in the piston restricted relatively to the throughway from said throughway to the outer cylinder beneath said outer head, cooperating valve and seat portions formed on the outer head surrounding the throughway and on the adjacent portion of the body respectively and offset relatively to the outlet port for closing the outlet port on movement of the piston outwardly, said piston being constructed and arranged to remain in position closing said outlet port when fluid pressure is equalized on both sides thereof, and said cooperating valve and seat portions being arranged to provide for slow leakage of fluid between the cylinders and the outlet port when the valve and seat portions are in closed relationship to return the piston to open position of said valve portion.

2. In a valve for cutting off excess flow in a fluid brake system, a body having an inner cylinder of smaller diameter and an outer cylinder of larger diameter axially aligned and opening into each other and having inlet and outlet ports communicating respectively with said inner and outer cylinders, a piston having an inner and an outer head slidable in said inner and outer cylinders respectively and having a longitudinal throughway for normal passage of fluid from the inlet port to the outlet port, a by-pass in the piston restricted relatively to the throughway from said throughway to the outer cylinder beneath said outer head, cooperating valve and seat portions formed on the outer head surrounding the throughway and on the adjacent portion of the body respectively and offset relatively to the outlet port for closing the outlet port on movement of the piston outwardly, said piston being constructed and arranged to remain in position closing said outlet port when fluid pressure is equalized on both sides thereof, and said cooperating valve portion being provided with a notch to provide for slow leakage of fluid between the cylinders and the outlet port when the valve and seat portions are in closed relationship to return the piston to open position of said valve portion.

3. In a valve for cutting off excess flow in a fluid brake system, a body having an inner cylinder of smaller diameter and an outer cylinder of larger diameter axially aligned and opening into each other and having inlet and outlet ports communicating respectively with said inner and outer cylinders, a piston having an inner and an outer head slidable in said inner and outer cylinders respectively and having a longitudinal throughway for normal passage of fluid from the inlet port to the outlet port, a by-pass in the piston restricted relatively to the throughway from said throughway to the outer cylinder beneath said outer head, a gasket forming a valve seat provided on the outer head surrounding the throughway and a valve formed on the adjacent portion of the body and offset relatively to the outlet port for closing the outlet port on movement of the piston outwardly, said piston being constructed and arranged to remain in position closing said outlet port when fluid pressure is equalized on both sides thereof, and said valve and valve seat being arranged to provide for slow leakage of fluid between the cylinders and the outlet port when the valve and seat are in closed relationship to return the piston to open position of said valve.

4. In a valve for cutting off excess flow in a fluid brake system, a body having an inner cylinder of smaller diameter and an outer cylinder of larger diameter axially aligned and opening into each other and having inlet and outlet ports communicating respectively with said inner and outer cylinders, a piston having an inner and an outer head slidable in said inner and outer cylinders respectively and having a longitudinal throughway for normal passage of fluid from the inlet port to the outlet port, a by-pass in the piston restricted relatively to the throughway from said throughway to the outer cylinder beneath said outer head, a gasket forming a valve seat provided on the outer head surrounding the throughway and a valve formed on the adjacent portion of the body and offset relatively to the outlet port for closing the outlet port on movement of the piston outwardly, said piston being constructed and arranged to remain in position closing said outlet port when fluid pressure is equalized on both sides thereof, and said valve being provided with a notch to provide for slow leakage of fluid between the cylinders and the outlet port when the valve and valve seat are in closed relationship to return the piston to open position of said valve.

References Cited in the file of this patent

UNITED STATES PATENTS

| Number | Name | Date |
| --- | --- | --- |
| 870,806 | Turner | Nov. 12, 1907 |
| 1,563,143 | Bailie | Nov. 24, 1925 |
| 2,159,788 | Farmer | May 23, 1939 |
| 2,366,044 | McCune | Dec. 26, 1944 |
| 2,512,190 | Waterman | June 20, 1950 |
| 2,583,295 | Greer et al. | Jan. 22, 1952 |

FOREIGN PATENTS

| Number | Country | Date |
| --- | --- | --- |
| 2,772 | Great Britain | 1906 |